Patented Oct. 24, 1922.

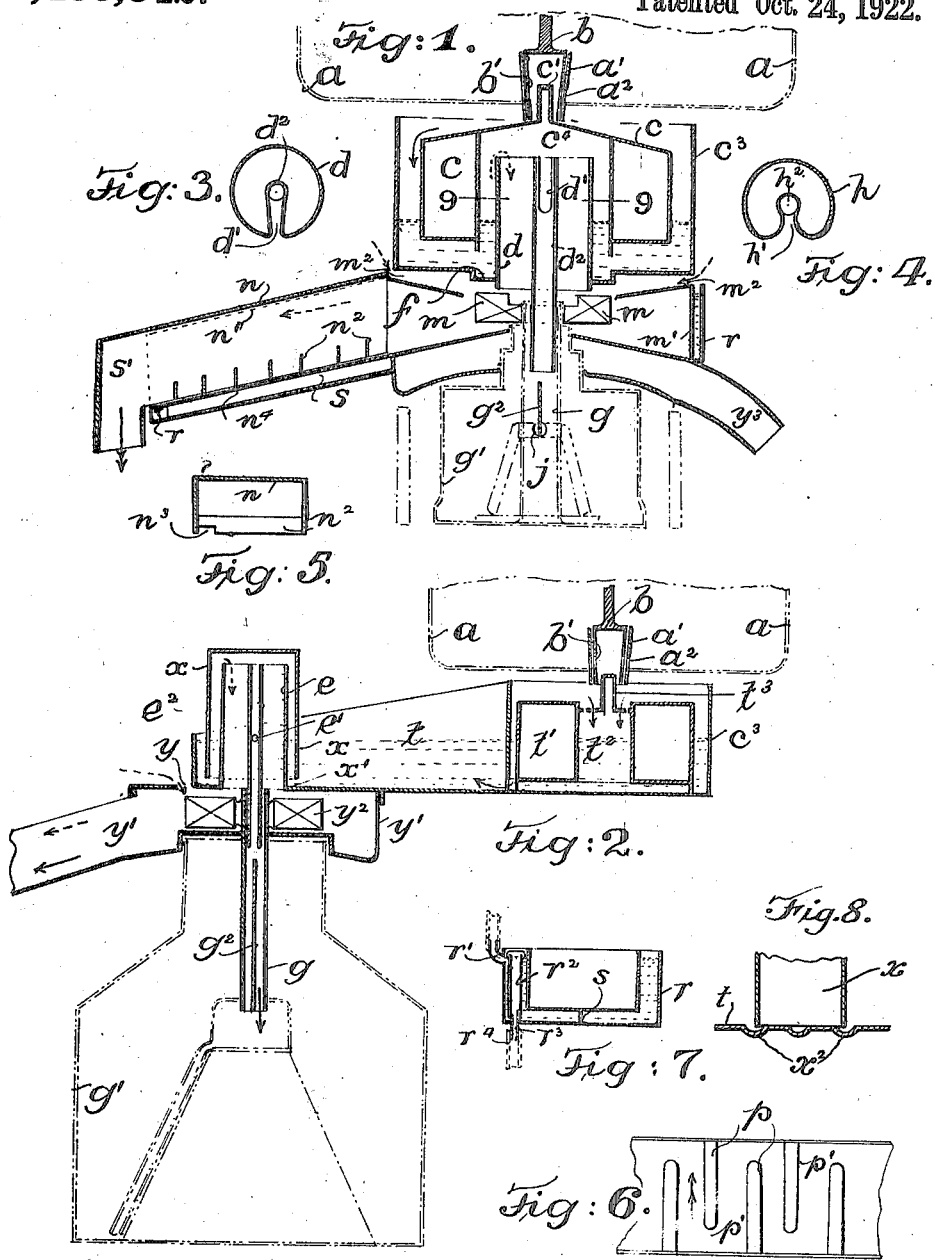

1,433,342

UNITED STATES PATENT OFFICE.

WILLIAM GORDON COOTE, OF NYABING, WESTERN AUSTRALIA, AUSTRALIA.

CREAM SEPARATOR.

Application filed January 18, 1921. Serial No. 438,163.

*To all whom it may concern:*

Be it known that I, WILLIAM GORDON COOTE, a subject of the King of Great Britain, residing at Nyabing, Western Australia, Commonwealth of Australia, have invented certain new and useful Improvements in Cream Separators, of which the following is a specification.

This invention relates to cream separators and its object is to obtain certain economic and other advantages in the working and use of said separators. One of the chief advantages of this invention consists in a perfect uniformity or regular and even density or constant ratio of cream at all speeds of the separator, that is, either at a low, medium, or high speed.

Further at all speeds and capacities all waste of cream is avoided and the skimmed milk is discharged in an impoverished condition and destitute of cream irrespective of variation type, of speed or of working capacity of the separator which may be employed and said working capacity may be increased or decreased as desired by the operator.

My invention attains this result by automatically governing the feed supply of the milk by suctional means and action and regulating the same in mutual agreement with the speed of the separator, while the invention also includes means whereby the cream is aerated and cooled and all animal and other objectionable odors, taints and flavors are removed and destroyed. In this invention the milk is downwardly fed to the bowl by means of suctional action as distinguished from gravity feed and I thereby attain a true and constant ratio of separation in respect of the feed of the milk with that of the speed of the separator, with the result that the skimmed milk is devoid of any cream or fatty matter while the cream is always of a standard consistency.

One of the chief structural features of the invention resides in the use of a fan or like suctional device which is either integrally or removably attached to the rotating bowl of the separator and by the rotation of said fan or device a suctional action is established and maintained and which suctional action is in perfect agreement with the varying speeds of the bowl.

This suctional action directly and positively regulates and controls the feed supply of the milk to the bowl without the aid of valves or other operative members.

The above mentioned and other structural features and advantages will now be explained with the aid of the attached drawings wherein the flow of the milk, air and cream is respectively indicated by full, broken and double headed arrows.

In said drawings Fig. 1 is a sectional elevation showing one embodiment of my invention as applied to cream separators in which the float chamber is located directly above the rotary bowl.

Fig. 2 is a sectional elevation of a modification having the float chamber located at one side of the rotary bowl.

Fig. 3 is a detail view of the combined air and unseparated milk discharge passage taken on section line 9—9 of Fig. 1.

Fig. 4 is a view similar to Fig. 3 of a modified form.

Fig. 5 is a vertical transverse section through the cream spout.

Fig. 6 is a fragmentary view of the cream spout showing the corrugations therein.

Fig. 7 is a transverse section of a further modification of the cream spout.

Figure 8 is a fragmentary elevation showing a slightly different construction of the means for affording a passage beneath the lower edge of the bell shaped member.

Referring to the structure shown in said Fig. 1 the milk reservoir $a$ is made with a short upstanding tube $a^1$ having inlet ports $a^2$ for the admission of the milk at a low level. This tube $a^1$ is closable by means of a tubular turn plug $b$ also having holes $b^1$ adapted to register with the inlet ports $a^2$ of the tube $a^1$ which latter downwardly projects as shown in order to make closable contact with the top of the float $c$.

The float is shown in the closed position and is made with a short upstanding stem $c^1$ which extends into said plug $b$. The float $c$ is made with a central and circular cavity $c^4$ which acts as an air chamber and is adapted to receive a tubular and annular casing $d$ open at the top and bottom; as shown this casing $d$ extends below the float chamber $c^3$ and is suitably secured thereto.

This casing $d$ is formed with a vertical elongated slot or port $d^1$ which communicates with the upper induction milk tube $d^2$ formed integrally with said casing as shown in the sectional plan view in Fig. 3 on lines 9—9 of Fig. 1. This milk induction tube $d^2$ extends from the top of the casing down into the milk bowl. A modified construction of this casing and induction tube is shown in Fig. 4 in which the casing $h$ is of a kidney like section and made with a gap $h^1$ in which is integrally formed the milk induction tube $h^2$.

In the bottom of the float chamber $c^3$ is formed a central depression $f$ which provides a low level space to effect the final suctional exhaustion of the milk from the float chamber and into the induction tube $d^2$ aforesaid.

Within the central tube $g$ of the milk bowl $g^1$ is formed a transverse or divisional wall or web $g^2$ whose upper edge is immediately below the outlet of the induction milk tube as $d^2$. The purpose of said wall $g^2$ is to prevent any "slip" of the milk and to cause it to be initially accelerated in speed as soon as it enters the bowl in order that an increased volume of milk may be fed to the milk ports $j$ through which the milk is delivered to the bottom of the bowl.

On the head of the bowl $g^1$ or other suitable position is removably or integrally secured a fan or other suctional device as $m$ which acts as the suctional agent for exhausting the air out of the chamber $c^4$ within the float $c$ and to therein establish and maintain a sufficient degree of vacuum to cause the milk to rise within said cavity or air chamber and be fed into the inlet slot or port $d^1$ in the upper milk induction tube and which degree of vacuum and resultant degree of feed of milk to the bowl is in obedience with and determined by the varying speeds of the separator.

This fan $m$ also acts as an agent for generating a current of air to cool and aerate the cream; said air current being directly fed to the fan through passages $m^2$ positioned below the float chamber. This air preparatory to entering the cream chamber may be cooled by water evaporation or chemical means. Within and across the removable cover $n$ of the cream spout $n^1$ are secured any number of baffle plates $n^2$ formed at their opposite ends with gaps $n^3$, through which the cream passes and is thereby "staggered" in its travel towards the final exit.

The lower edges of these baffle plates rest upon the bottom $n^4$ of the spout.

The purpose of said baffles $n^2$ is to "stagger" the cream in its movement and to compel it to flow over an extended area or surface the better to effect its cooling and aeration prior to its final discharge. Sufficient air space exists above said baffles for the free outward passage of the air current.

As shown in Fig. 6 instead of said baffles I may form the bottom $n^4$ of the cream spout with upward corrugations $p$ which partially extend across the width of the spout and allow of the staggered passage of the cream in the resultant depressions $p^1$.

As shown in Figs. 1 and 7, surrounding the cream chamber and its spout is formed a water jacket $r$ fed by a high level supply pipe as $r^1$ to thereby create a circulation of cool water, said jacket having a high level discharge consisting of a tubular cap $r^2$ fitting in an upstanding foot socket $r^3$ to which a flexible pipe $r^4$ connects to carry away the heated water and also to empty the jacket when required.

On the underside of the spout $n^1$ is formed a divisional web or wall $s$ whose purpose is to cause the cooling water to circulate over a maximum area.

The cover $n$ of the cream spout is formed with a downwardly extending terminal $s^1$ in order to provide means for baffling the cream spray issuing from the spout.

Referring to Fig. 2 wherein is shown a structural modification to permit of the float being used at one side of the separator, an extension chamber as $t$, being provided.

In this view the float $t^1$ is shown in its open position.

This float is made with centrally positioned orifices $t^2$ which allow the milk to directly flow into the float chamber and said float is made with an upstanding tube $t^3$ similar to $c^1$ already described in connection with the structure shown in Fig. 1. In operative combination with the annular casing $e$ is employed a removable thimble or bell $x$ which may be made of glass in order to enable "Speed readings" on the casing to be visible for indicating the varying speeds of the separator. This bell $x$ encloses the casing and its bottom edge $x^1$ may be gapped as shown in Fig. 2.

Air inlet ports $y$ are formed in the cover of the cream chamber $y^1$ for the supply of air to the fan $y^2$ for the cooling and aerating of the cream.

With cream separators whose cream exit is positioned below the exit $y^3$ for the skimmed milk, ports may be provided for admitting air for the cooling of the cream—said ports leading to a position below the skimmed milk discharge pan to prevent any suction or escape of the skimmed milk into the cream chamber which latter is also water jacketed.

These latter mentioned air admission ports convey air to additional blades on the bowl and which air feed is in excess of that as supplied to the fans $m$ or $y^2$ for the suctional feed of the milk.

It will be understood from the foregoing description that the improved device may be mounted on a cream separator of any suitable and well known type and may have the fan attached to and driven by the rotatable separator bowl. When the separator is driven at a slow speed, relatively little suction is created by the fan and consequently the degree of air pressure reduction in chamber $c^4$ is small and very little milk will flow through opening $d^1$. If, however, the separator is driven at a higher rate of speed, the suction will be greater and a more rapid flow of the milk will ensue. Thus it will be seen that the milk flow is controlled by the speed of rotation of the separator.

What I claim as my invention and desire to secure by Letters Patent is:—

1. In a cream separator in combination, a receptacle for unseparated milk, a separator bowl, a discharge passage for unseparated milk from said receptacle to said bowl and a suction operated float valve for controlling the rate of flow of unseparated milk from said receptacle to said bowl.

2. In a cream separator, in combination, a receptacle for unseparated milk, a separator bowl, a passage for unseparated milk from said receptacle to said bowl and operative a suction producing means driven by said separator bowl and a float valve operated by said suction producing means for controlling the rate of flow of unseparated milk from said receptacle to said bowl.

3. In a cream separator in combination, a receptacle for unseparated milk, a separator bowl and a suction controlled float valve for feeding unseparated milk from said receptacle to said bowl in ratio to the speed of said bowl.

4. In a separator in combination, a receptacle for unseparated milk, a separator bowl and a suction controlled float valve mounted on and operated by said separator bowl for feeding unseparated milk from said receptacle to said bowl in ratio to the rotary speed of said bowl.

5. In a cream separator in combination, a receptacle for unseparated milk, a separator bowl, a passage for unseparated milk from said receptacle to said bowl and a suction controlled float valve for controlling the rate of delivery of milk from said receptacle to said bowl according to the speed of the bowl.

6. In a cream separator in combination, a source of supply of unseparated milk, a receptacle for unseparated milk, means for maintaining a substantially constant liquid level in said receptacle, a separator bowl, a passage for unseparated milk from said receptacle to said bowl and a suction controlled float valve for controlling the rate of delivery of milk from said receptacle to said bowl according to the speed of the bowl.

7. In a cream separator in combination, a receptacle for unseparated milk, having a chamber therein, a separator bowl, a discharge passage for unseparated milk from said chamber to said bowl, an opening in said discharge passage within said chamber and above the normal liquid level therein and means for creating a partial vacuum within said chamber to raise said liquid level.

8. In a cream separator in combination, a receptacle for unseparated milk having a chamber therein, a separator bowl, a discharge passage for unseparated milk from said chamber to said bowl, an opening in said discharge passage within said chamber and above the normal liquid level therein, means for creating a partial vacuum within said chamber to raise said liquid level within the chamber and means for varying the degree of said vacuum according to the speed of said bowl.

9. In a cream separator in combination, a source of supply of unseparated milk, a receptacle for unseparated milk, a float and valve for maintaining a substantially constant liquid level in said receptacle, a chamber within said receptacle and said float, a separator bowl, a discharge passage for unseparated milk from said chamber to said bowl, an opening in said discharge passage within said chamber and above the normal liquid level therein and means for creating a partial vacuum within said chamber to raise said liquid level therein.

10. In a cream separator in combination, a source of supply of unseparated milk, a receptacle for unseparated milk, a float and valve for maintaining a substantially constant liquid level in said receptacle having a chamber therein, a separator bowl, a passage for unseparated milk from said chamber to said bowl, an opening in said passage within said chamber and above the normal liquid level therein, means for creating a partial vacuum in said chamber to raise the liquid level therein and means for varying the vacuum according to the speed of the separator bowl.

11. In a cream separator, means for aerating the cream discharged therefrom comprising a spout for said cream, means for creating a draft of air in said spout and obstructions in said spout for said cream whereby the cream is agitated and aerated.

12. In a cream separator, means for aerating the cream discharged therefrom comprising a spout for said cream, means for creating a draft of air in said spout and staggered baffles in said spout for said cream whereby the latter has a prolonged contact with the draft of air.

13. In a cream separator, in combination, means for controlling the rate of flow of unseparated milk to the separator bowl comprising a receptacle for unseparated milk, a chamber within said receptacle, an inlet passage for unseparated milk to said chamber, a discharge passage for milk from said chamber to said bowl, an opening in said passage within said chamber and above the normal liquid level therein, an exhaust fan mounted on and driven by said bowl and a passage connecting said fan to said chamber whereby said fan may create a partial vacuum within said chamber.

14. In a cream separator, means for controlling the rate of flow of unseparated milk to the separator bowl comprising a source of supply of unseparated milk, a receptacle for unseparated milk, a float within the receptacle controlling said source of supply to maintain a substantially constant liquid level within the receptacle, a chamber in said float open at its bottom, a separator bowl, a discharge passage for unseparated milk from said chamber to said bowl, an opening in said passage within the chamber and above the normal liquid level therein, an exhaust fan mounted on and driven by said bowl and a passage connecting said fan to said chamber and above the maximum liquid level therein whereby said fan may create a partial vacuum within said chamber.

15. In a cream separator in combination, a chamber for unseparated milk having an inlet passage for milk at its lower end, a separator bowl, a discharge passage for milk from said chamber to said bowl, an opening in said passage within the chamber and above the normal liquid level therein, a fan driven by said separator, said fan being connected at its intake side to the chamber above the maximum liquid level therein, a cream spout, a skimmed milk spout and means for directing the exhaust from said fan through the cream spout to aerate the cream.

16. In a cream separator in combination, a chamber for unseparated milk having an inlet passage for milk at its lower end, a separator bowl, a discharge passage for milk from said chamber to said bowl, an opening in said passage within the chamber and above the normal liquid level therein, a fan driven by said separator having an intake passage connected to the chamber above the maximum liquid level therein, an auxiliary passage for air also connected to the intake side of said fan, a cream spout, a skimmed milk spout and means for bringing the cream in said spout in contact with the exhaust from said fan to aerate said cream.

17. In a cream separator in combination, a source of supply of unseparated milk, a receptacle for said milk, a float within said receptacle controlling said source to maintain a substantially constant liquid level within said receptacle, a chamber for said milk within said receptacle, an inlet passage for said milk at the lower end of said chamber, a separator bowl, a discharge passage for unseparated milk from said chamber to said bowl, an opening in said discharge passage within said chamber and above the normal liquid level therein, a fan driven by the separator, a passage connecting the intake side of said fan to the chamber and above the maximum liquid level therein, an auxiliary passage for air also connected to the intake side of said fan, a skimmed milk spout, a cream spout and means for directing the exhaust from said fan through said cream spout to aerate the cream therein.

18. In a cream separator in combination, a source of supply of unseparated milk, a receptacle for said milk, a passage for milk between said source of supply and said receptacle, a float within said receptacle controlling said passage to maintain a substantially constant liquid level within said receptacle, a chamber for unseparated milk within said receptacle, an inlet passage for milk for said chamber, a separator bowl, a discharge passage for unseparated milk from said chamber to said bowl, an opening in said discharge passage within the chamber and above the normal liquid level therein, an exhaust fan mounted on and driven by said separator bowl, a passage connecting the intake side of said fan to said chamber above the maximum liquid level therein, an auxiliary passage for air also connected to the intake of said fan, a skimmed milk spout, a cream spout and means for directing the exhaust of said fan through the cream spout to aerate the cream therein.

19. In combination with a cream separator having a bowl, a reservoir, a float receptacle, a liquid passage from said reservoir to said float receptacle, a chambered float valve for controlling said passage located in said receptacle, an induction tube forming communication between said chamber and bowl, a fan located on said separator and rotatable therewith, a passage communicating with the intake side of said fan and said chamber, an air passage between said intake side of the fan and the atmosphere, and an outlet for cream from said bowl in communication with the outlet side of said fan.

20. A cream separator comprising a receptacle, a closed chamber in said receptacle, a passage for liquid from said receptacle to the bottom of said chamber, a bowl, a passage forming communication between said chamber and said bowl, a cream outlet passageway leading from said bowl, a second passage from said chamber having its intake end elevated above said first named passage, and means in communication with said second named passage and said cream outlet for partially exhausting the air in said chamber and aerating liquid in said cream outlet.

21. A cream separator comprising a bowl, a receptacle having a chamber formed therein, a passage between the bottoms of said chamber and receptacle, a tube extending above the bottom of said chamber and forming communication between said chamber and bowl, a second passage having communication with said chamber above that of said first named passage, a cream outlet from said bowl, and means communicating with said second named passage and said outlet for exhausting air from said chamber and at the same time aerating liquid in said outlet, a reservoir in communication with said receptacle, and means for automatically varying the flow of liquid from said reservoir to said chamber in proportion to the rate of flow of the liquid therefrom.

In testimony whereof I have hereunto set my hand in presence of two subscribing witnesses.

WILLIAM GORDON COOTE.

Witnesses:
   RICHARD SPARROW,
   FRED H. LAMBERT.